March 20, 1945.　　　C. C. WHITTAKER　　　2,372,151
TURBINE LOCOMOTIVE CONTROL SYSTEM
Filed July 20, 1943　　　3 Sheets-Sheet 1

WITNESSES:

INVENTOR
Charles C. Whittaker.
ATTORNEY

March 20, 1945.  C. C. WHITTAKER  2,372,151
TURBINE LOCOMOTIVE CONTROL SYSTEM
Filed July 20, 1943   3 Sheets-Sheet 2
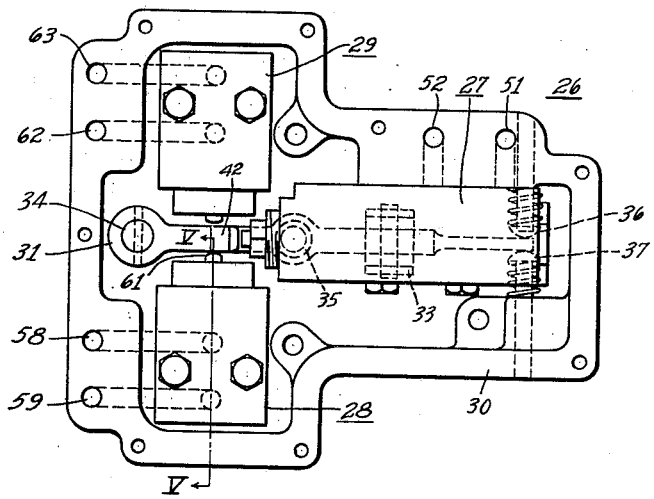
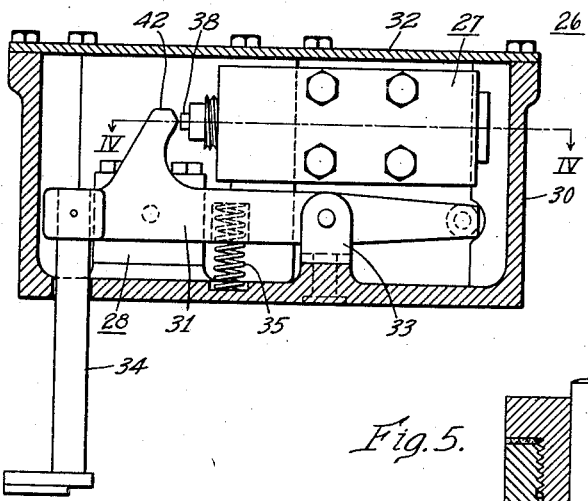
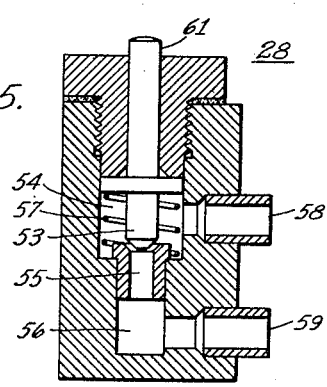
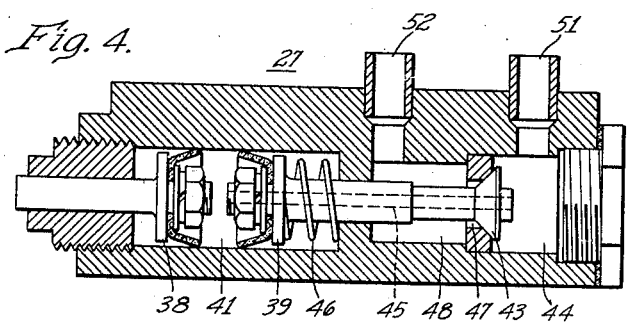
WITNESSES:
INVENTOR
Charles C. Whittaker.
BY
ATTORNEY March 20, 1945.   C. C. WHITTAKER   2,372,151
TURBINE LOCOMOTIVE CONTROL SYSTEM
Filed July 20, 1943   3 Sheets-Sheet 3

WITNESSES:

INVENTOR
Charles C. Whittaker.
BY
ATTORNEY

Patented Mar. 20, 1945

2,372,151

UNITED STATES PATENT OFFICE 2,372,151

TURBINE LOCOMOTIVE CONTROL SYSTEM

Charles C. Whittaker, Pittsburgh, Pa., assignor to Westinghouse Electric & Manufacturing Company, East Pittsburgh, Pa., a corporation of Pennsylvania Application July 20, 1943, Serial No. 495,443

8 Claims. (Cl. 192—82)

My invention relates, generally, to the control of locomotives and, more particularly, to the control of turbine driven locomotives.

On locomotives which are driven by turbines, the forward drive turbine is usually geared directly to the driving wheels. When this is done a reverse turbine is necessary for reversing the locomotive. The reverse turbine may be connected into the rotating system by means of a clutch which is disengaged while the forward turbine is in operation. Therefore, it is necessary that the locomotive be at a standstill when the reverse clutch is engaged.

An object of my invention is to permit the clutch for the reverse turbine of a locomotive to be engaged when, and only when, the locomotive is at a standstill.

Another object of my invention is to provide a motion-detecting device which shall be simple and efficient in operation and which may be economically manufactured and installed.

A further object of my invention is to provide a fluid-pressure operated motion-detecting device.

Still another object of my invention is to provide a motion-detecting device which is responsive to movement in either of two directions.

Other objects of my invention will be explained fully hereinafter or will be apparent to those skilled in the art.

In accordance with one embodiment of my invention, a fluid-pressure operated device, which is responsive to any rotational movement in either direction, so controls the operation of a hydraulically-operated clutch for the reverse turbine of a turbine-driven locomotive that the clutch cannot be actuated into engagement unless the locomotive is substantially at a standstill.

For a fuller understanding of the nature and objects of my invention, reference may be had to the following detailed description, taken in conjunction with the accompanying drawings, in which:

Fig. 2 is a view, in plan, of a motion-detecting device constructed in accordance with my invention, the top cover being removed;

Fig. 3 is a view, partially in elevation and partially in section, of the device shown in Fig. 2;

Fig. 4 is an enlarged view, in section, the section being taken along the line IV—IV of Fig. 3;

Fig. 5 is an enlarged view, in section, the section being taken along the line V—V of Fig. 2;

Figure 6:
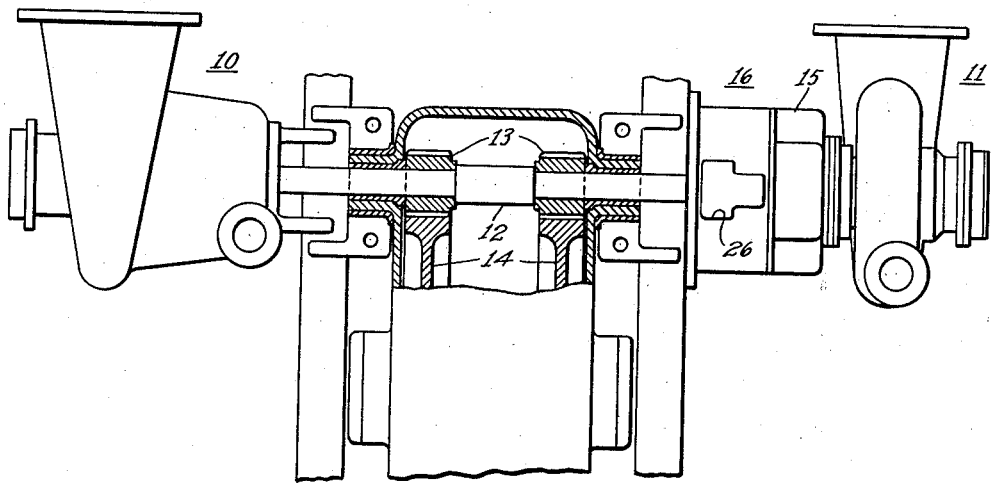
Fig. 6 is a reduced view, in plan, of a portion of the locomotive structure showing the location of the forward and the reverse turbines, a portion being broken away for clearness.

Referring to the drawings, and particularly to Fig. 6, the portion of the locomotive structure shown therein comprises a forward driving turbine 10 and a reverse driving turbine 11. The forward turbine 10 is directly connected by a shaft 12 and pinions 13 to gears 14, which, in turn, are connected to the driving wheels of the locomotive (not shown). The reverse turbine 11 is provided with a reduction gear unit 15 which is connected to the shaft 12 by means of a clutch 16.

Figure 1:
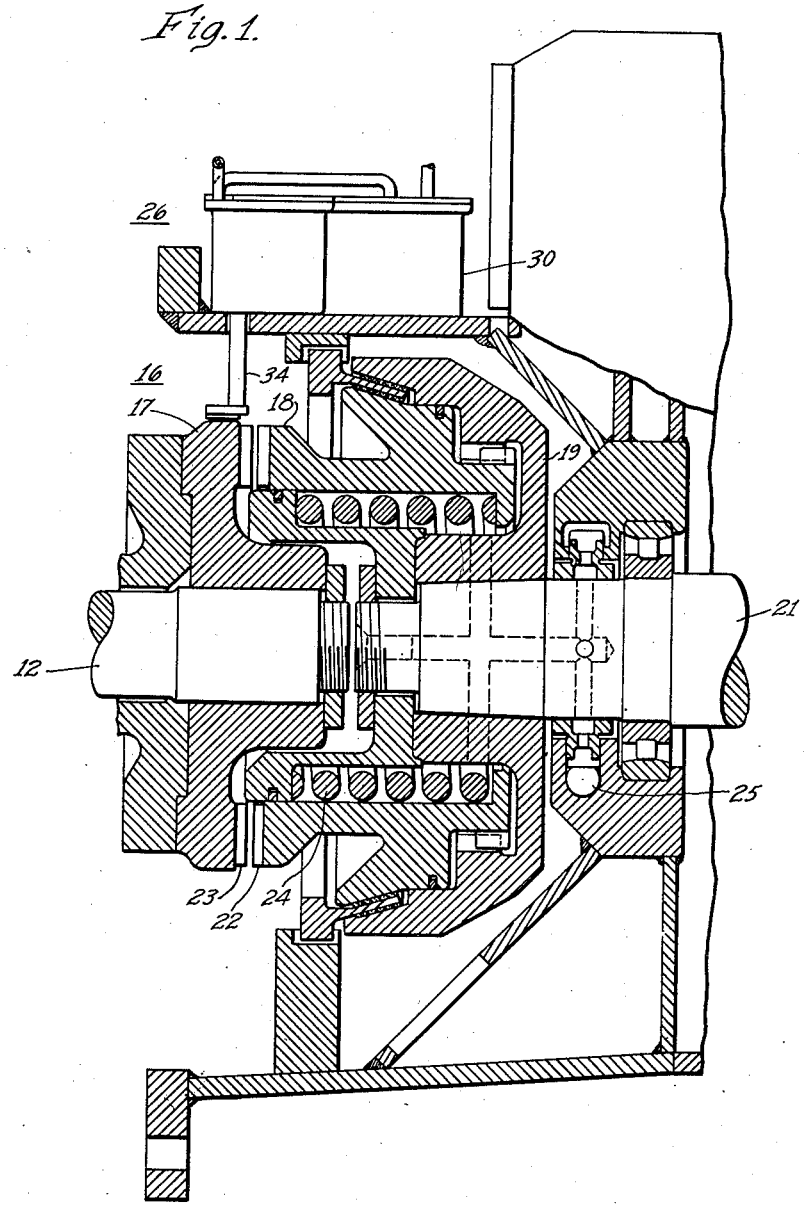
Figure 1 is a view, partially in section and partially in elevation, of a portion of a turbine-driven locomotive in which my invention is utilized.

As shown in Fig. 1 the clutch 16 may be of the type disclosed in the copending applications of G. M. Mierley, Serial No. 452,597, filed July 28, 1942 and now Patent No. 2,345,410, and J. S. Newton, Serial No. 485,196, filed April 30, 1943 and comprises a driven member 17 secured to the shaft 12 and a driving member 18 splined to a member 19 that is secured to a shaft 21 which is driven by the reverse turbine 11 through the reduction gear unit 15. The driving member 18 is provided with a plurality of teeth 22 which may be actuated into engagement with similar teeth 23 provided on the driven member 17. The driving member 18 is normally retained out of engagement with the driven member 17 by a spring 24.

The teeth 22 may be actuated into engagement with the teeth 23 by the admission of a fluid under pressure to the clutch housing through a pipe 25. When the pressure fluid is admitted to the clutch housing, sufficient pressure is applied to the member 18 to overcome the force of the spring 24 and cause the teeth 22 to engage the teeth 23 on the driven member 17.

As explained hereinbefore it is desirable that the member 18 should not be actuated into engagement with the member 17 unless the locomotive, and consequently the member 17, is at a complete standstill. Furthermore, it is also desirable that the clutch members should be disengaged only when the locomotive is at a standstill.

In order to accomplish the foregoing results a motion-detecting device 26 may be mounted on top of the housing for the clutch 16. As shown in Figs. 2 to 5, inclusive, the motion-detecting device 26 comprises a cylinder assembly 27, valve assemblies 28 and 29, and an arm 31, all of which are enclosed in a housing 30 having a removable cover 32.

As shown in Fig. 3, the arm 31 is trunnioned at 33 for movement in two planes and is provided at one end with a finger or plunger 34 which extends through the bottom of the housing 30. The lower end of the plunger 34 is disposed to engage the driven member 17 of the clutch 16 when the end of the arm 31 which carries the plunger 34 is actuated downwardly about its pivot 33. A spring 35 normally biases the end of the arm 31 which carries the plunger 34 upwardly to retain the plunger out of engagement with the clutch member 17. As shown in Fig. 2, the arm 31 is centered about the pivot 33 in a horizontal plane by spring-biased centering pins 36 and 37 which are disposed on opposite sides of the end of the arm 31 which is opposite from the end carrying the plunger 34.

As shown in Fig. 4, the cylinder assembly 27 contains pistons 38 and 39 disposed in a chamber 41. As shown in Fig. 3, the end of the piston 27 extends through one end of the cylinder 27 to engage a projection 42 on the arm 31. As shown in Fig. 4, the piston 39 carries a valve 43 which is disposed in a chamber 44 in the cylinder 27. An opening 45 extends through the piston 39 from the chamber 44 into the chamber 41 for a purpose which will be hereinafter explained. The valve 43 is normally biased by a spring 46 to close an opening 47 between the chamber 44 and a chamber 48 in the cylinder 27. Openings 51 and 52 are provided for making external connections to the chambers 44 and 48 respectively.

As shown in Fig. 5, the valve assembly 28 comprises a valve member 53 which is slidably disposed in a chamber 54 to close an opening 55 between the chamber 54 and a chamber 56. The valve 53 is normally retained open by a spring 57. Openings 58 and 59 are provided for making external connections to the chambers 54 and 56 respectively.

As shown in Fig. 2, the valve 53 is provided with a stem 61 which extends through the end of the valve assembly and may be engaged by the arm 31 to close valve 53, as will be explained more fully hereinafter. The valve 29 is similar in structure to the valve 28, and, therefore, will not be described in detail.

The operation of the motion-detecting device is as follows: Assume that a fluid, such as compressed air, is admitted to the chamber 44 through the opening 51 as a result of the operation of the reverse throttle of the locomotive. The air is free to pass through the opening 45 into the chamber 41 where it causes the piston 38 to move outwardly. As explained hereinbefore, the piston rod 38 engages the projection 42 of the arm 31 and causes the end of the finger or plunger 34 to engage the outer periphery of the driven member 17.

If the driven member 17 is not rotating, the finger 34 and the arm 31 stay in their mid position as determined by the centering members 36 and 37. Under this condition, air pressure builds up in the chamber 41 until it is sufficient to overcome the pressure of the spring 46 and actuates the piston 39 to open the valve 43. The opening of the valve 43 permits air to flow from the chamber 44 into the chamber 48 and out through the opening 52.

Figure 7:
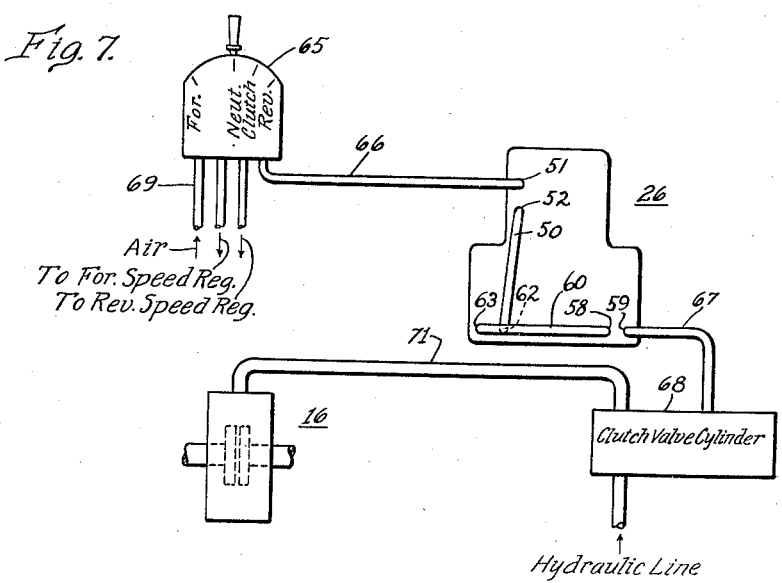
Fig. 7 is a diagrammatic view of the locomotive control system.

As shown in Figure 7, the opening 52 may be connected by a pipe 50 to an opening 62, for the valve assembly 29. An opening 63 for the valve assembly 29 may be connected by a pipe 60 to the opening 58 for the valve assembly 28. The opening 59 for the valve assembly 28 may be connected to a valve for controlling the admission of the pressure fluid to the clutch 16, as will be explained more fully hereinafter. Since it has been assumed that the driven member 17 is stationary at this time, both of the valves 28 and 29 are open and the air is free to flow through these valves to the valve for controlling the operation of the clutch 16.

However, if it be assumed that the driven member 17 is rotating in either direction, the finger 34 will be dragged by the motion of the clutch member, and the arm 31 will pivot about pivot 33 to close the valve member in one or the other of the valves 28 and 29, depending on the direction of motion of the clutch member 17. Since the valve 28 or the valve 29 will be closed before the piston 39 operates to open the valve 43 to permit air to leave the cylinder 27 through the opening 52, the air is prevented from reaching the valve which controls the operation of the clutch. In this manner there is no possibility of the clutch being engaged if there is the slightest movement of the clutch member 17.

If motion is present when the engine man tries to engage the reversing clutch, he observes that nothing has happened and the reverse lever may be moved to the off position. In this manner the supply of air is removed from the cylinder 27 and the finger 34 disengages the driven member 17. The arm 31 is returned to its mid position by the centering members 36 and 37.

The operation may be repeated by returning the control lever to the reverse position which readmits air to the cylinder 27. As explained hereinbefore, if at this time the driven member 17 is at a standstill, the motion detecting device will permit the air to flow through to the valve for controlling the operation of the clutch.

The application of the present device to the control of a hydraulically operated clutch, such as the one herein illustrated, is diagrammatically shown in Fig. 7. As shown, a throttle controlling device 65 is connected to the motion-detecting device 26 by an air line 66. The motion-detecting device 26 is connected, by an air line 67, to a valve cylinder 68 which controls the operation of the clutch 16.

Assuming that it is desired to operate the locomotive in the reverse direction, the throttle device 65 is actuated from the "neutral" position through the "clutch" position to the "reverse" position. In this manner air is admitted from an air line 69 through the throttle device 65 and the pipe 66 into the motion-detecting device 26. As explained hereinbefore, if the locomotive is at a standstill at this time, the air flows through the motion-detecting device 26 and the air line 67 into the cylinder 68. When the pressure in the cylinder 68 is sufficiently high, a valve is operated in a hydraulic line 71, thereby operating the clutch 16.

When it is desired to disengage the clutch 16, the lever of the throttle device 65 is actuated from the "reverse" position through the "clutch" position to the "neutral" position, thereby admitting air into the motion-detecing device 26. As explained hereinbefore, if the locomotive is at a standstill while the control lever is in the "clutch" position, the air is permitted to flow through the device 26 and into the cylinder 68 to operate the valve in the hydraulic line 71. In this manner the supply of pressure fluid to the clutch 16 is shut off and the clutch is disengaged since the valve in the hydraulic line is alternately opened and closed upon the admission of air to the cylinder 68.

From the foregoing description it is apparent that I have provided a motion-detecting device which is suitable for controlling the reverse clutch of a turbine driven locomotive. It is also apparent that the device herein described may be utilized for other applications where it is necessary to detect a slight amount of motion in either of two directions.

Since numerous changes may be made in the above-described construction, and different embodiments of the invention may be made without departing from the spirit and scope thereof, it is intended that all matter contained in the foregoing description or shown in the accompanying drawings shall be interpreted as illustrative and not in a limiting sense.

I claim as my invention:

1. In a control system, in combination, a driven member, a driving member, means for actuating the driving member into engagement with the driven member, and a fluid-pressure operated device responsive to movement of the driven member in either direction for controlling the operation of said actuating means, said device having a fluid-pressure operated member for engaging said driven member, and valve means actuated by movement of said fluid-pressure operated member by said driven member to prevent the operation of said actuating means except when the driven member is substantially at a standstill.

2. In a control system, in combination, a driven member, a driving member, means for actuating the driving member into engagement with the driven member, and a fluid-pressure operated device responsive to movement of the driven member in either direction for controlling the operation of said actuating means, said device having a plunger movable longitudinally into engagement with said driven member, and valve means actuated by transverse movement of said plunger by said driven member to prevent the operation of said actuating means except when the driven member is substantially at a standstill.

3. In a control system, in combination, a driven member, a driving member, means for actuating the driving member into engagement with the driven member, and a fluid-pressure operated device responsive to movement of the driven member in either direction for controlling the operation of said actuating means, said device having a plunger movable longitudinally into engagement with said driven member, and valve means actuated by transverse movement of said plunger in either of two directions by said driven member to prevent the operation of said actuating means except when the driven member is substantially at a standstill.

4. A device for detecting motion of an external member comprising a longitudinally and transversely movable plunger, fluid-pressure operated means for actuating said plunger longitudinally into engagement with the external member, and valve means actuated by transverse movement of said plunger in either of two directions by said external member.

5. A device for detecting motion of an external member comprising a longitudinally and transversely movable plunger, fluid-pressure operated means for actuating said plunger longitudinally into engagement with the external member, and valve means independently operable by transverse movement of said plunger by said external member.

6. A device for detecting motion of an external member comprising a longitudinally and transversely movable plunger, fluid-pressure operated means for actuating said plunger longitudinally into engagement with the external member, and a pair of oppositely disposed valves independently operable by transverse movement of said plunger by said external member.

7. A device for detecting motion of an external member comprising a longitudinally and transversely movable plunger, a pivotally mounted arm for carrying said plunger, fluid-pressure operated means for actuating said arm to move the plunger into engagement with the external member, and a pair of oppositely disposed valves independently operable by transverse movement of said plunger by said external member.

8. A device for detecting motion of an external member comprising a longitudinally movable plunger, an arm for carrying said plunger, said arm being pivotally mounted for movement in two planes, fluid-pressure operated means for actuating said arm and said plunger in one plane to move the plunger into engagement with the external member, and a pair of oppositely disposed valves independently operable by movement of said plunger and said arm in the other plane by said external member.

CHARLES C. WHITTAKER.